United States Patent
Azzam et al.

(10) Patent No.: US 10,650,007 B2
(45) Date of Patent: May 12, 2020

(54) RANKING CONTEXTUAL METADATA TO GENERATE RELEVANT DATA INSIGHTS

(71) Applicant: Microsoft Technology Licensing, LLC, Redmond, WA (US)

(72) Inventors: Saliha Azzam, Redmond, WA (US); Steven Paul Breyer, Medina, WA (US); Eeshan Manish Shah, Redmond, WA (US); Youssef El Fassy Fihry, Redmond, WA (US); Ankur Satyendrakumar Sharma, Redmond, WA (US); Manal Hussein Alassaf, Redmond, WA (US); Xiang He, Bothell, WA (US); Vikram Rajasekaran, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 200 days.

(21) Appl. No.: 15/184,858

(22) Filed: Jun. 16, 2016

(65) Prior Publication Data

US 2017/0308536 A1   Oct. 26, 2017

Related U.S. Application Data

(60) Provisional application No. 62/327,383, filed on Apr. 25, 2016.

(51) Int. Cl.
  *G06F 16/2457* (2019.01)
  *G06F 16/248* (2019.01)
  *G06F 16/242* (2019.01)

(52) U.S. Cl.
  CPC ...... *G06F 16/24578* (2019.01); *G06F 16/248* (2019.01); *G06F 16/2425* (2019.01); *G06F 16/2457* (2019.01)

(58) Field of Classification Search
  CPC ......... G06F 17/30395; G06F 17/30522; G06F 17/30554
  (Continued)

(56) References Cited

U.S. PATENT DOCUMENTS 5,875,446 A   2/1999   Brown et al.
7,219,073 B1   5/2007   Taylor et al.
(Continued)

OTHER PUBLICATIONS

Fish, et al., "Visual Exploration System in an Industrial Context", In Journal of IEEE Transactions on Industrial Informatics, vol. 12, Issue 2, Apr. 2016, pp. 567-575.
Sokol, et al., "Context-Based Analytics in a Big Data World: Better Decisions", In Publication of IBM Redbook, Jul. 17, 2013, pp. 1-8.
Lorentz, Alissa, "With Big Data, Context is a Big Issue", Published on: Apr. 2013, Available at: http://www.wired.com/insights/2013/04/with-big-data-context-is-a-big-issue/.
(Continued)

*Primary Examiner* — Joshua Bullock
(74) *Attorney, Agent, or Firm* — Fiala & Weaver P.L.L.C.

(57) ABSTRACT

Aspects extend to methods, systems, and computer program products for ranking contextual metadata to generate relevant data insights. Aspects of the invention can be used to enhance data analytics by automatically deriving relevance signals used to generate insights closely related to the context in which a user is exploring or analyzing data. User experiences can include embedded data visualizations, search engines, and natural language querying systems to help users understand their data more effectively. By utilizing metrics on the relevance information, insights related and/or relevant to the context in which the user is analyzing data can be created. Thus, relevance information can define a scope for a variety of automatically generated insights of data. Insight generation can be based on computed relevance signals that target areas interesting to users.

20 Claims, 6 Drawing Sheets

(58) Field of Classification Search
USPC .......................................................... 707/723
See application file for complete search history.

(56) References Cited

U.S. PATENT DOCUMENTS

| | | | |
|---|---|---|---|
| 8,024,666 B2 | 9/2011 | Thompson | |
| 8,200,618 B2 | 6/2012 | Gibson et al. | |
| 8,494,133 B2 | 7/2013 | Jeffs et al. | |
| 8,938,450 B2 | 1/2015 | Spivack et al. | |
| 8,996,555 B2 | 3/2015 | Kuchmann-Beauger et al. | |
| 9,081,466 B2 | 7/2015 | Gauthier et al. | |
| 9,170,834 B2* | 10/2015 | Beda .................. | G06F 9/45558 |
| 9,218,396 B2 | 12/2015 | Hamborg et al. | |
| 9,224,217 B2 | 12/2015 | Winkle et al. | |
| 2006/0047636 A1 | 3/2006 | Mohania et al. | |
| 2006/0288000 A1* | 12/2006 | Gupta ............... | G06F 17/30867 |
| 2007/0005646 A1 | 1/2007 | Dumais et al. | |
| 2010/0057728 A1* | 3/2010 | Quick ................ | G06F 17/3087 705/14.57 |
| 2010/0094829 A1* | 4/2010 | Castellanos ........... | G06F 16/217 707/705 |
| 2011/0055196 A1 | 3/2011 | Sundelin et al. | |
| 2012/0239643 A1* | 9/2012 | Ekstrand ........... | G06F 17/30672 707/723 |
| 2013/0304819 A1 | 11/2013 | Oane et al. | |
| 2015/0100562 A1 | 4/2015 | Kohlmeier et al. | |

OTHER PUBLICATIONS

Derczynski, et al., "Towards context-aware search and analysis on social media data", iI Proceedings of the 16th International Conference on Extending Database Technology, Mar. 18, 2013, pp. 137-142.

"Analytics made easy", Retreived on: Apr. 4, 2016, Available at: http://ibm.com/analytics/watson-analytics/us-en/?cm_mmc=search-IND-gsn-_search_q1_generic_bmm-_-analysis%20data-broad-_-ind&mkwid=sLGaT4nF3-dc_87342888857_432atl2594&gclid=CJHas-ri9ssCFRKhaAodVLkOeA.

Han, et al., "Data Mining for Web Intelligence", In Journal of Computer, vol. 35, Issue 11, Nov. 2002, pp. 54-70.

Jansen, et al., "Real time search on the web: Queries, topics, and economic value", In Journal of Information Processing & Management, vol. 47, Issue 4, Jul. 2011, pp. 1-16.

Chung, Sonia, "Search Insights: Discovering and Testing Brand Associations", Published on: Feb. 2014, Available at: https://www.thinkwithgoogle.com/articles/search-insights-discovering-and-testing-brand-associations.html.

Kaushik, Avinash, "Google Insights for Search: Competitive Intelligence Analysis", Published on: Aug. 27, 2008, Available at: http://www.kaushik.net/avinash/competitive-intelligence-analysis-google-insights-for-search/.

"VMware vRealize Log Insight User's Guide", Published on: Mar. 25, 2015, Available at: https://pubs.vmware.com/log-insight-25/topic/com.vmware.ICbase/PDF/log-insight-25-users-guide.pdf.

Baalamithra, et al., "Context-Aware Automatic Query Refinement Using Indian-Logic Based Ontology", In Proceedings of the Third International Conference on Advances in Semantic Processing, Oct. 11, 2009, 6 Pages.

"International Search Report and Written Opinion Issued in PCT Application No. PCT/US2017/028023", dated Jul. 26, 2017, 12 Pages.

* cited by examiner

RANKING CONTEXTUAL METADATA TO GENERATE RELEVANT DATA INSIGHTS

CROSS-REFERENCE TO RELATED APPLICATIONS

This application claims the benefit of U.S. Provisional Patent Application Ser. No. 62/327,383, entitled "Deriving Insights For Structured Data", filed Apr. 25, 2016 which is incorporated herein in its entirety.

BACKGROUND

Background and Relevant Art

Computer systems and related technology affect many aspects of society. Indeed, the computer system's ability to process information has transformed the way we live and work. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments. For example, distributed applications can have components at a number of different computer systems.

In some environments, data is accessed from one computer system and presented at another computer system. For example, a computer system can send a query to a database to request that data be returned from the database to the computer system. Parameters included in the query define the data that the computer system is requesting. A query processor associated with the database processes the parameters to identify the requested data. The database then returns the requested data back to the computer system. The computer system can render the requested data at a display device.

Queries can be automatically generated at a computer system in response to executing instructions at the computer system. Queries can also be generated by computer system users. Rendering data from a database can include presenting the data to a user at a display device.

BRIEF SUMMARY

Examples extend to methods, systems, and computer program products for ranking contextual metadata to generate relevant data insights. A query is analyzed to derive contextual metadata from the query. The contextual metadata defines how the query was used to retrieve (structured and/or unstructured) data from a database. The data is presented in a structured arrangement at a display device. A combination of topics relevant to the data is identified based at least on the contextual metadata. Other metadata is derived from user activities and settings at the computer system.

One or more additional queries is formulated to retrieve relevant insights corresponding to the combination of topics. The one or more additional queries are formulated from the contextual metadata and the other metadata. The one or more additional queries are submitted to data sources to obtain the relevant insights. The relevant insights are received from the data sources. The relevant insights are presented at a display device along with a structured arrangement.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Examples extend to methods, systems, and computer program products for ranking contextual metadata to generate relevant data insights. A query is analyzed to derive contextual metadata from the query. The contextual metadata defines how the query was used to retrieve (structured and/or unstructured) data from a database. The data is presented in a structured arrangement at a display device. A combination of topics relevant to the data is identified based at least on the contextual metadata. Other metadata is derived from user activities and settings at the computer system.

One or more additional queries is formulated to retrieve relevant insights corresponding to the combination of topics. The one or more additional queries are formulated from the contextual metadata and the other metadata. The one or more additional queries are submitted to data sources to obtain the relevant insights. The relevant insights are received from the data sources. The relevant insights are presented at a display device along with a structured arrangement.

Implementations may comprise or utilize a special purpose or general-purpose computer including computer hardware, such as, for example, one or more computer and/or hardware processors (including Central Processing Units (CPUs) and/or Graphical Processing Units (GPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: structured data, structured arrangements (e.g., textual, graphical, etc.), queries, contextual metadata from queries (e.g., query intent, query filtering characteristics, query transforms, types of calculations, etc.), other metadata (e.g., from user activities, user history, user search results, settings, etc. at a computer system), relevant topics, rankings for topics, insights corresponding to topics, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, structured data, structured arrangements (e.g., textual, graphical, etc.), queries, contextual metadata from queries (e.g., query intent, query filtering characteristics, query transforms, types of calculations, etc.), other metadata (e.g., from user activities, user history, user search results, settings, etc. at a computer system), relevant topics, rankings for topics, insights corresponding to topics, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In many computing environments, user experiences include embedded data visualizations, search engines, and natural language querying systems to help users understand their data more effectively. User (data-related) experiences, can also include relevance information (including semantic queries, filters, highlighted items, click-through telemetry) that describes the data structures used to create the user experiences. By extracting and/or deriving metrics on the relevance information, insights can be created that are related and/or relevant to the context in which the user is analyzing. Thus, relevance information can define a scope for a variety of automatically generated insights of structured (and/or unstructured) data. Insights generation can be based on computed relevance signals that target those areas most interesting to users.

Aspects of the invention can be used to enhance data analytics by automatically deriving relevance signals used to generate insights closely related to the context in which a user is exploring or analyzing data. Relevance signals can include usage of semantic data, user clicks, and other contextual information from the user experience. The relevance signals can be used to scope the insights to those which the user is more likely to find interesting and/or relevant. Accordingly, aspects factor in the context in which a user is working to increase the relevance of generated insights.

Figure 1:
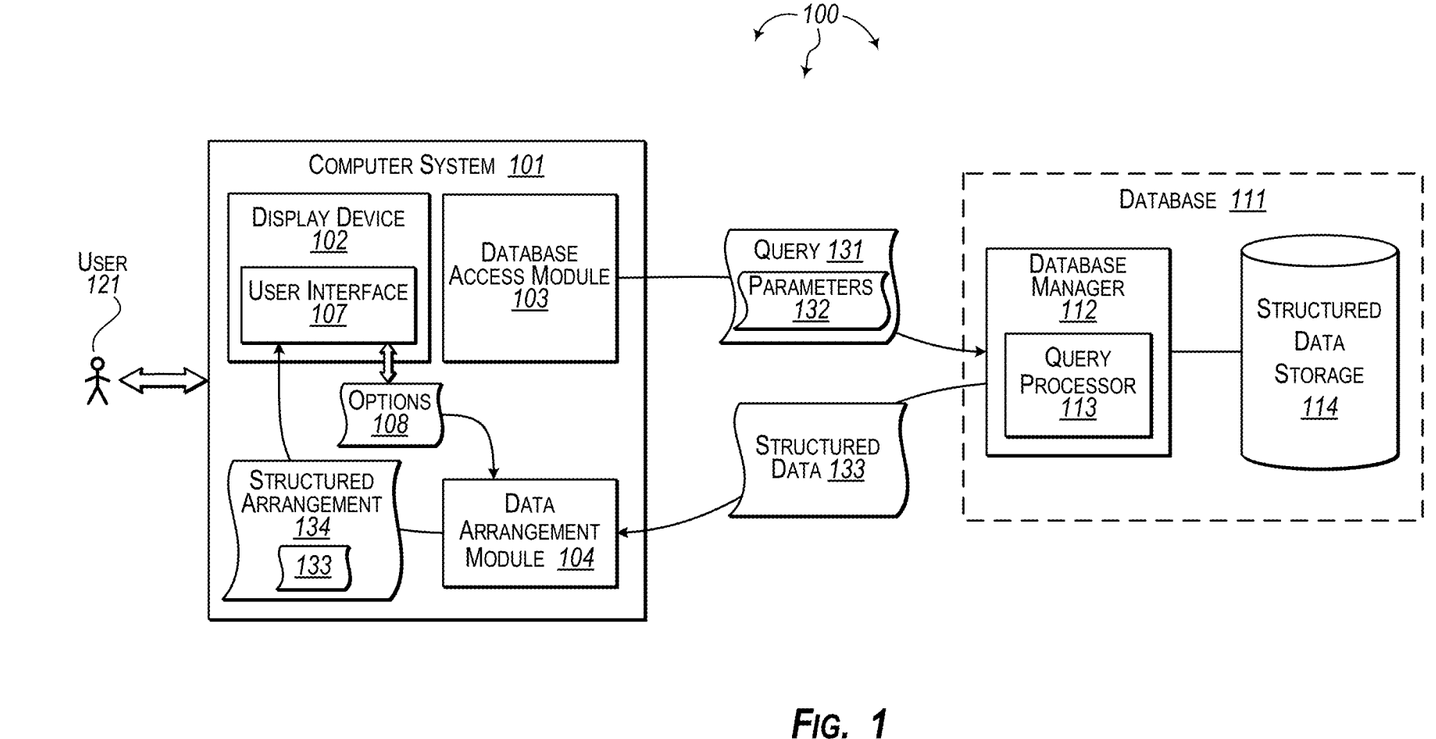
FIG. 1 illustrates an example architecture that facilitates retrieving and presenting data.

FIG. 1 illustrates an example computer architecture 100 that facilitates retrieving and presenting data. Referring to FIG. 1, computer architecture 100 includes computer system 101 and database 111. Computer system 101 and database 111 can be connected to (or be part of) a network, such as, for example, a Local Area Network ("LAN"), a Wide Area Network ("WAN"), and even the Internet. Accordingly, computer system 101 and database 111 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

As depicted, computer system 101 includes display device 102, database access module 103, and data arrangement module 104. Computer system 102 can also include other modules (not shown) configured to present user interface 107 on display device 102. User 121 can interact with user interface 107 to query databases (e.g., database 111), select options 108 for viewing data (e.g., to present structured data graphically, to present structured data textually, etc.), and view data received from queried databases (e.g., graphically, textually, etc.). On an automated basis or in response to commands from user 121, database access module 103 is configured to submit queries (e.g., Structured Query Language ("SQL") commands) to databases. Data arrangement module 104 is configured to create structured data arrangements (e.g., in accordance with user selected options) for data returned to computer system 101 from data sources (e.g., databases).

In one aspect, database 111 includes database manager 112 and structured data storage 114. Database manager 112 also includes query processor 113. Database 111 can be a relational database managed by a relational database system. Accordingly, data stored in structured data storage 114 can be organized into one or more tables (or relations) of columns and rows (records or tuples). Each row and/or column can be associated with a unique key. Each table in structured data storage 114 can represent an entity type, such as, for example, customers, products, etc. Rows within each table represent instances of the entity type and columns within each table represent values attributed to that instance (such as address or price).

Database manager 112 is configured to receive queries from other computer systems and return query results to the other computer systems. Received queries can be processed at query processor 113 to derive a query intent from parameters contained in the queries. Database manager 112 can then retrieve data from structured data storage 114 in accordance with the query intent. Retrieved structured data can then be returned back to another computer system as query results.

In one aspect, user 121 formulates query 131 (e.g., a SQL query) including parameters 132 (e.g., various SQL commands) Database access module 103 can send query 131 to database 111. Database access can also store query 131 in a storage location (e.g., in system memory and/or durable storage) at computer system 101.

Database manager 112 can receive query 131 and forward query 131 to query processor 113 for processing. Query processor 113 can process query 131 to derive the intent of query 131 from parameters 132. Based on the intent of query 131, database manager can retrieve structured data 133 (e.g., one or more portions of data contained in one or more tables of structured data storage 114).

Database manager 112 can return structured data 133 to computer system 101. Data arrangement module 104 can receive structured data 133 from database 111. Data arrangement module 104 can create structured arrangement 134 (e.g., a graphical arrangement, such as a chart, textual arrangement, or voice arrangement) containing structured data 133 in accordance with options 108. Computer system 101 can present structured arrangement 134 at user interface 107.

In other aspects, data arrangement module 104 creates a structured arrangement containing unstructured data returned from one or more data sources.

Figure 2:
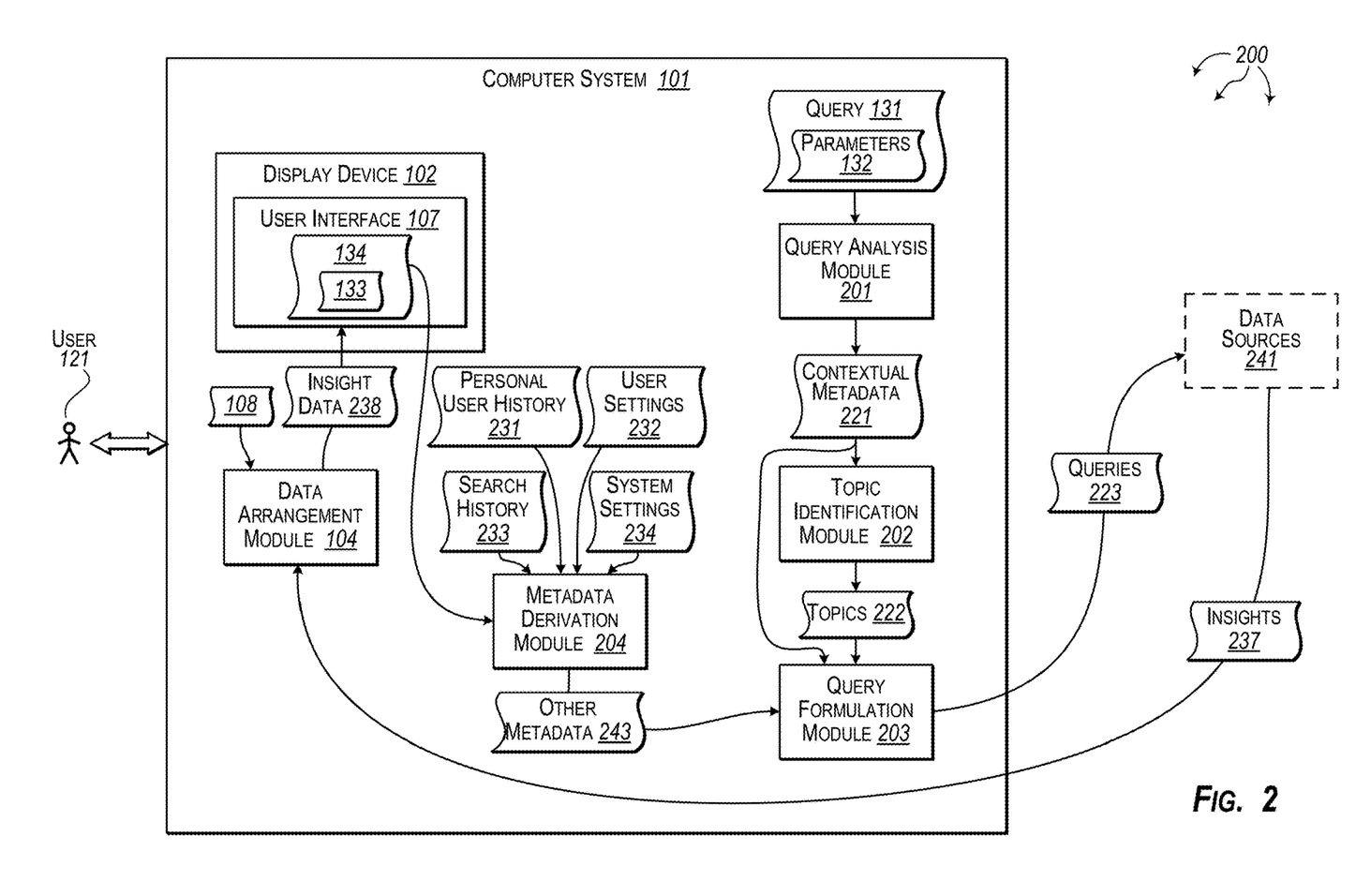
FIG. 2 illustrates an example architecture that facilitates deriving insights for data.

FIG. 2 illustrates an example computer architecture 200 that facilitates deriving insights for data. Computer architecture 200 includes computer system 101 and data sources 241. As depicted, computer system 101 includes some of the modules from computer architecture 100 and also includes query analysis module 201, topic identification module 202, query formulation module 203, and metadata derivation module 204. Computer system 101 and data sources 241 can be connected to (or be part of) a network, such as, for example, a Local Area Network ("LAN"), a Wide Area Network ("WAN"), and even the Internet. Accordingly, computer system 101 and data sources 241 as well as any other connected computer systems and their components, can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Query analysis module 201 is configured to analyze a query to derive contextual metadata from the query. Contextual metadata can include the intent of the query, data filtering characteristics of the query, types of calculations included in the query, etc. Query analysis module 201 can access queries that were previously stored at computer system 101 (e.g., by database access module 103).

Topic identification module 202 is configured to identify a combination of topics relevant to structured data based at least on contextual metadata for a query used to retrieve the structured data. Identified topics for a query can be relevant to the intent of the query.

Metadata derivation module 204 is configured to derive other metadata from other data at computer system 101. For example, metadata derivation module 204 can derive metadata from one or more of: structured data presented at user interface 107, user history, user settings, search history, system settings, system resource availability, etc.

Query formulation module 203 is configured to formulate queries for querying other data sources for insights corresponding to identified topics. Queries can be formulated in system memory of computer system 101. Queries can be formulated from one or more of: contextual metadata, other metadata, and one or more topics from an identified combination of topics. Formulated queries can be transforms of other queries.

Query formulation module 203 can send formulated queries to other data sources to query for insights. In some aspects, the functionality of database access module 103 and functionality of query formulation module 203 are integrated into a common module. Alternately, the functionality of database access module 103 is included in query formulation module 203 or vice versa.

Data arrangement module 104 can be further configured to receive insights from other data sources. Data arrangement module 104 can present insights along with a structured data arrangement (containing structured and/or unstructured data) at user interface 107.

Data sources 241 are configured to receive queries and return data (insights) responsive to the queries. Data sources 241 can include a variety of diverse data sources, such as, for example, relational databases, web sites, log files, social networking data, legacy documents, streamed data, etc. In one aspect, database 111 is included in data sources 241.

Figure 3:
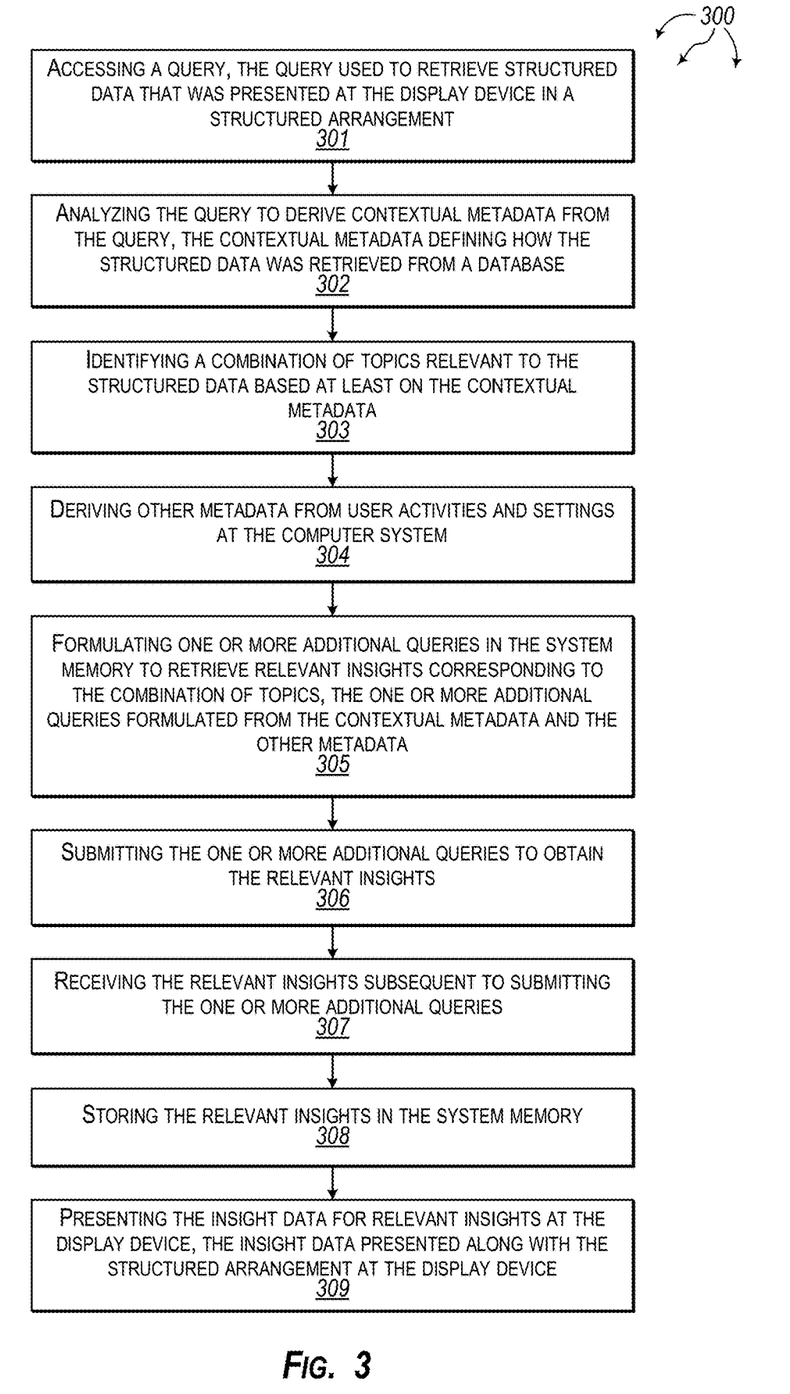
FIG. 3 illustrates a flow chart of an example method for deriving insights for data.

FIG. 3 illustrates a flow chart of an example method 300 for deriving insights for structured data. Method 300 will be described with respect to the components and data of computer architecture 100 and computer architecture 200.

Method 300 includes accessing a query, the query used to retrieve structured data that was presented at the display device in a structured arrangement (301). For example, query analysis module 201 can access query 131 that was used to retrieve structured data 133. Structured data 133 was presented at display device 102 in structured arrangement 134. Query analysis module 201 can access query 131 from system memory or durable storage (e.g., when database access module 103 previously stored query 131) and/or can access query 131 at or around the time database access 103 sends query 131 to database 111.

Method 300 includes analyzing the query to derive contextual metadata from the query, the contextual metadata defining how the structured data was retrieved from a database (302). For example, query analysis module 201 can analyze query 131 (e.g., a SQL query), including parameters 132 (e.g., various SQL commands), to derive contextual metadata 221. Contextual metadata 221 can define how structured data 133 was retrieved from database 111. Contextual metadata 221 can include the intent of query 131, data filtering characteristics defined in parameters 132, types of calculations included in parameters 132, etc.

Method 300 includes identifying a combination of topics relevant to the structured data based at least on the contextual metadata (303). For example, topic identification module 202 can identify topics 222 relevant to structured data 133 based at least on contextual metadata 221.

In other aspects, query analysis module 201 and topic identification module 202 perform operations similar to 301, 302, and 303 for unstructured data. As such, query analysis module 201 and topic identification module 202 can operate and interoperated to identify topics 222 relevant to unstructured data. In further aspects, query analysis module 201 and topic identification module 202 operate and interoperated to identify topics 222 for a combination of structured and unstructured data.

Method 300 includes deriving other metadata from user activities and settings at the computer system (304). For example, metadata derivation module 204 can derive other metadata 243 from one or more of: personal user history 231, user settings 232, search history 233, and system settings 234. In some aspects, metadata derivation module 204 also uses characteristics of structured data arrangement 134 to derive other metadata 243.

Method 300 includes formulating one or more additional queries in the system memory to retrieve relevant insights corresponding to the combination of topics, the one or more additional queries formulated from the contextual metadata and the other metadata (305). For example, query formulation module 230 can formulate queries 223 in system memory of computer system 101 to retrieve relevant insights corresponding to topics 222. Queries 223 can be formulated from contextual metadata 221 and other metadata 243. One or more queries included in queries 223 can be a transform of query 131.

Method 300 includes submitting the one or more additional queries to obtain the relevant insights (306). For example, query formulation module 203 can submit queries 223 to data sources 241. Queries 223 can include one or more queries to be submitted to a number of different data sources within data sources 241.

Method 300 includes receiving the relevant insights subsequent to submitting the one or more additional queries (307). For example, computer system 101 can receive insights 237 from data sources 241. Insights 237 can include one or more insights from the number of different data sources within data sources 241.

Method 300 includes storing the relevant insights in the system memory (308). For example, insights 237 can be stored in system memory at computer system 101.

Method 300 includes presenting relevant insight data from system memory at the display device, the insight data presented along with the structured arrangement at the display device (309). For example, data arrangement module 104 can present insight data 238 at display device 102. Insight data 238 can be presented along with structured arrangement 134 within user interface 107. In one aspect, insights 237 are presented from system memory at user interface 107. In other aspects, insights 237 are accessed from system memory and filtered to formulated insight data 238. Insight data 238 is then presented at user interface 107.

Figure 4:
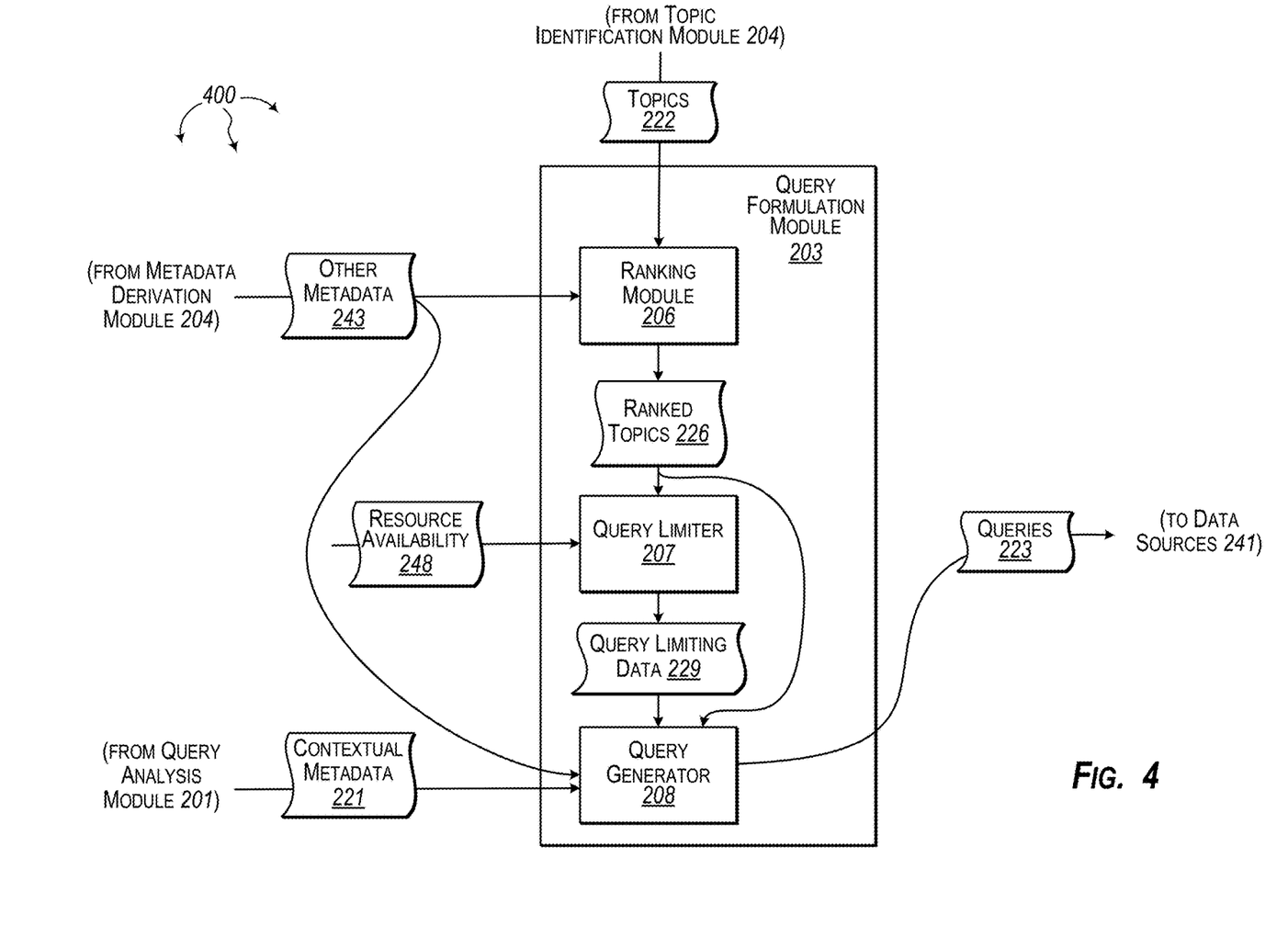
FIG. 4 illustrates a more detailed view of a query formulation module.

In some aspects, query formulation module 203 limits the number of queries that are sent to data sources 241 to less than the potential maximum number of queries that can be sent to data sources 241. FIG. 4 illustrates a more detailed view 400 of query formulation module 203. As depicted, query formulation module 203 further includes ranking module 206, query limiter 207, and query generator 208.

Ranking module 206 can access topics 222 and other metadata 243 (including characteristics of structured arrangement 134 and/or structured data 133). Ranking module 206 can rank topics 222 based at least on other metadata 243. Ranking module can output ranked topics 226. Ranking module 206 can assign topics deemed more relevant a higher rank. On the other hand, ranking module 206 can assign topics deemed less relevant a lower rank. Assigned rankings for topics can be reflected in ranked topics 226.

Query limiter 207 can access ranked topics 226 and resource availability 248. Resource availability 248 can indicate the availability of one or more resources, such as, for example, processor resources, system memory resources, screen space, etc. at computer system 101. Based on ranked topics 226 and resource availability 248, query limiter 207 can formulate query limiting data 229 (e.g., a number of queries) based on a number of queries and/or insights that can be handled at computer system 101.

In some aspects, based on resource availability 248, query limiter 207 determines that resource availability at computer system 101 is sufficient to handle the queries and insights for (essentially) all of ranked topics 226 (i.e., all of topics 222). In these aspects, query limiter 207 does not limit the number of queries included in queries 223 (and may not formulate query limiting data 229). Query generator 208 considers contextual metadata 221 and other metadata 243 when formulating queries 223.

In other aspects, based on resource availability 248, query limiter 207 determines that availability of one or more resources at computer system 101 is insufficient to handle the queries and insights for (essentially) all of ranked topics 226. In these other aspects, query limiter 207 determines a number of queries and/or insights that can be sufficiently handled based on resource availability. From the number of queries and/or insights, query limiter 207 formulates query limiting data 229.

It may be that available resources can handle a specified number of queries but not the insights returned from the specified number of queries. For example, sufficient processor and/or memory may be available for query processing but available screen space at display device 102 may be limited. As such, query limiter 207 can anticipate resource consumption of insights based on the number of queries and limit the number of queries accordingly.

In these other aspects, different topics may utilize different amounts of resources. Starting with a highest ranked topic in ranked topics 226 and moving incremental to each lower ranked topic, query limiter 207 can determine if resource availability is sufficient. For example, if resource availability is sufficient for handling queries and insights for the highest ranked topic, query limiter 207 checks if resource availability is sufficient for handling queries and insights for the highest ranked topic and the second highest ranked topic. If resource availability is sufficient for handling queries and insights for the highest ranked topic and the second highest ranked topic, query limiter 207 checks if resource availability is sufficient for handling queries and insights for the highest ranked topic, the second highest ranked topic, and the third highest ranked topic. Query limiter 207 can continue until resources are determined to be insufficient for a group of topics. Query limiter 207 can formulate query limiting data 229 to limit query generation to queries for a group of topics for which resources are determined to be sufficient.

In these other aspects, query generator 208 considers contextual metadata 221, other metadata 243, ranked topics 226, and query limiting data 229 (e.g., a number of queries or other limiting data from query limiter 207) when formulating queries 223. Query generator 208 can generate queries 223 for higher ranked topics as determined by query limiting data 229. Query generator 207 does not generate queries for some of the topics included in ranked topics 226 (e.g., lower ranked topics). Accordingly, query limiter 207 reduces the likelihood of insight generation consuming the resources of computer system 101 to the detriment of other applications running at computer system 101.

Figure 5:
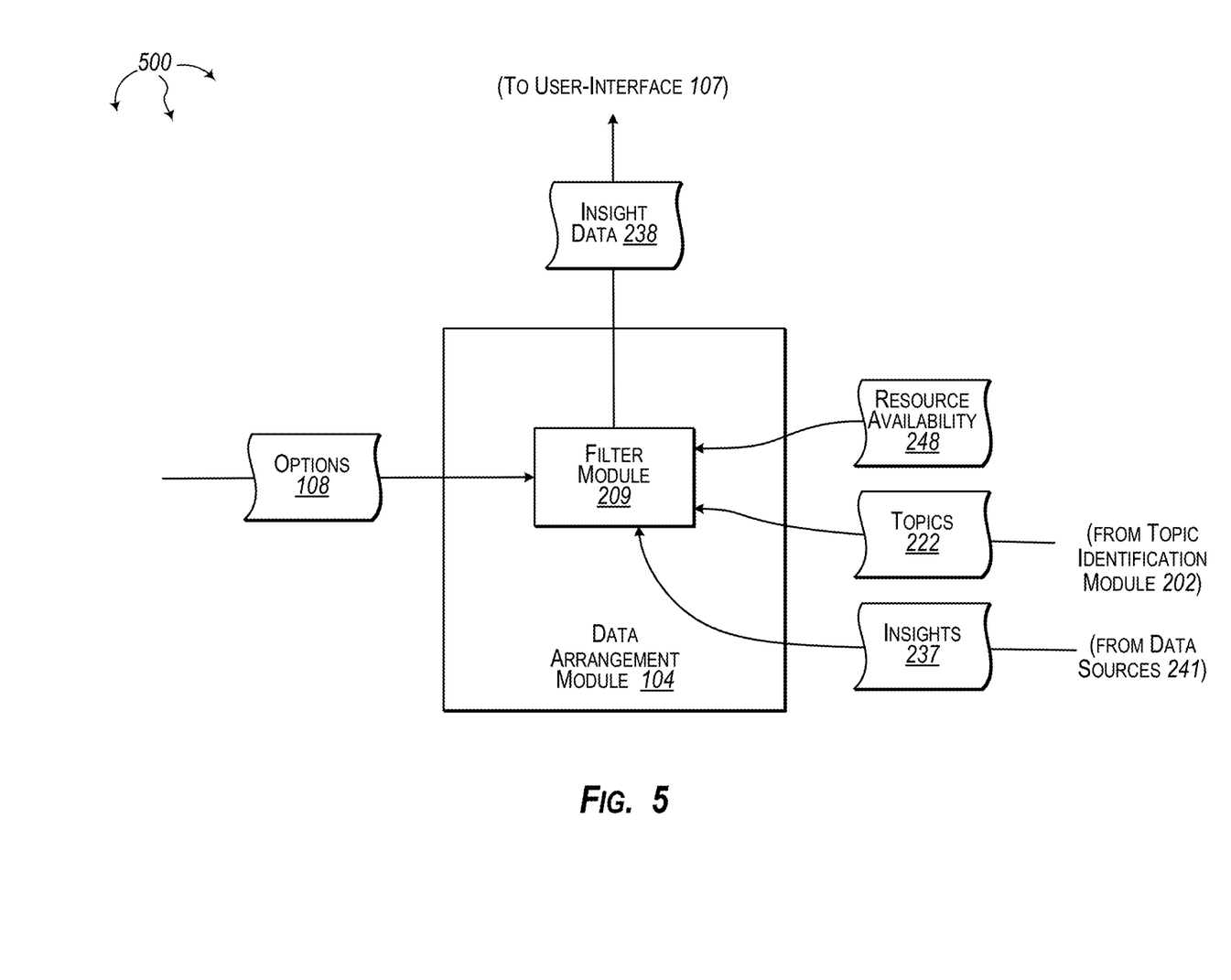
FIG. 5 illustrates a more detailed view of a data arrangement module.

In some aspects, data arrangement module 104 filters insights that are presented at user interface 107. FIG. 5 illustrates a more detailed view 500 of data arrangement module 104. As depicted, data arrangement module 104 further includes filter module 209. Based on resource availability 248 and topics 222, filter module 209 can filter insights 237 into insight data 238. Data arrangement module 104 can present insight data 238 along with structured arrangement 134 in accordance with options 108.

As such, data arrangement module 104 can account for changes in resource availability (e.g., screen space) that occur between sending queries 223 and receiving insights 237. For example, if user 102 activates additional applications shortly after sending queries 223, available screen space may be reduced relative to the time query limiter considered resources 248. Data arrangement module 104 can compensate for the reduction in available screen space to reduce the likelihood of insight generation consuming the resources of computer system 101 to the determent of other applications running at computer system 101.

Figure 6:
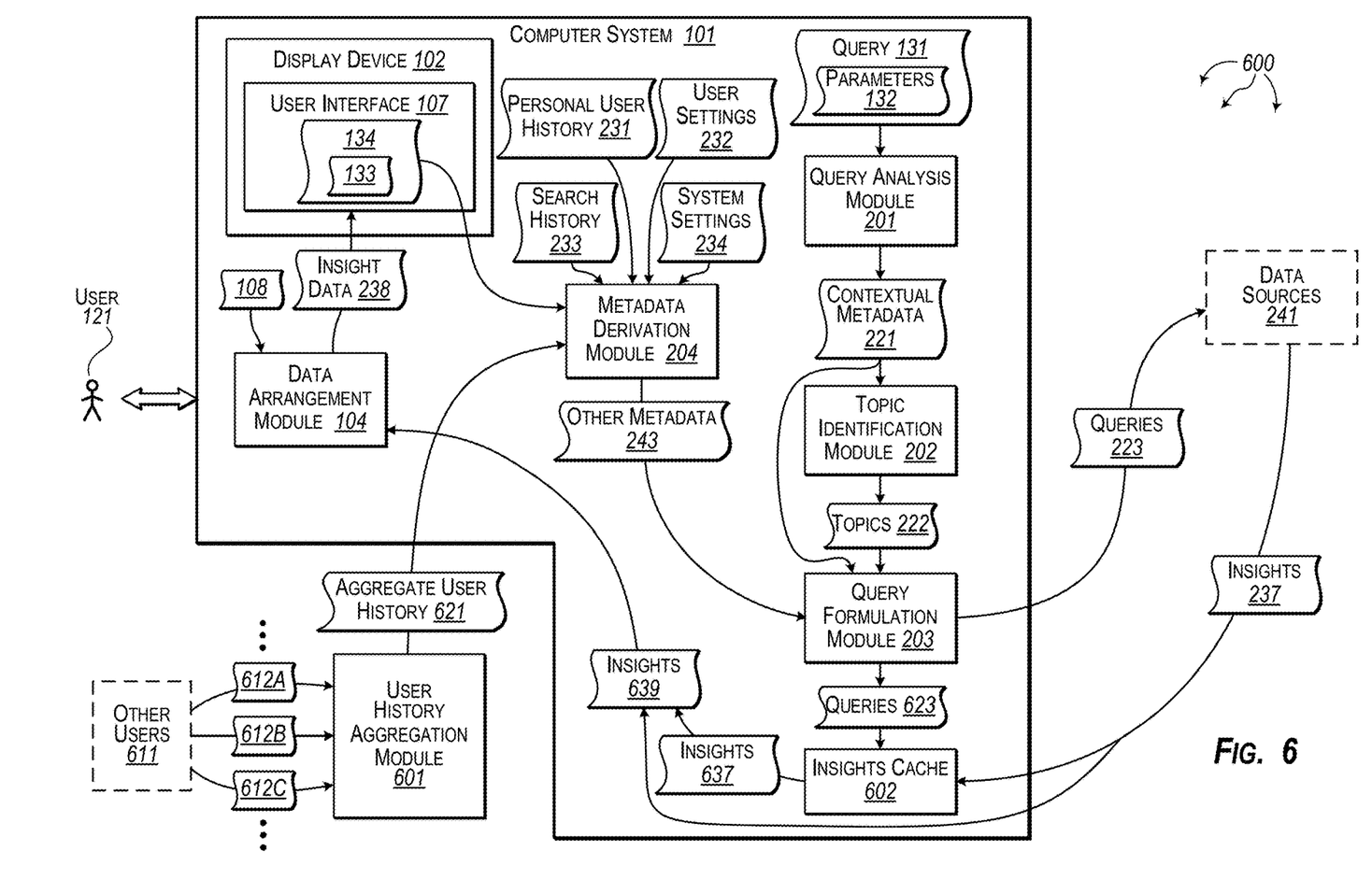
FIG. 6 illustrates an example architecture that facilitates deriving insights for data.

FIG. 6 illustrates an example computer architecture 600 that facilitates deriving insights for structured data. Computer architecture 600 is similar to computer architecture 200 and includes some additional components. As depicted, computer architecture 600 includes user history aggregation module 601 and insights cache 602. Insights cache 602 can be in system memory (e.g., RAM) or more durable storage media (e.g., magnetic disk, SSD, etc.)

User history aggregation module 601 is configured to aggregate personal user histories from multiple users into an aggregate user history. For example, user history aggregation module 601 can access personal user histories 612A, 612B, 612C, etc. from other users 611. User history aggregation module 601 can also access personal user history 231. User history aggregation module 601 can aggregate personal user histories 612A, 612B, 612C, etc. along with personal user history 231 into aggregate user history 621.

Metadata derivation module 204 can consider aggregate user history 621 (along with other depicted inputs) when deriving other metadata 243. As such, the user history for other users 611 can be considered when generating relevant data insights for user 121. Considering aggregate user history 621 can assist with identifying relevant insights for a user that has limited personal user history.

In general, insight cache 602 is used to cache insights returned from data sources 241. Insights cache 602 can be used to more efficiently return insights in response to queries from query formulation module 203. For example, query formulation module 203 may have submitted one or more other sets of queries prior to submitting queries 223. Insights returned from the prior queries cam be cached in insights cache 203.

Query formulation module 203 can formulate queries 623 along with queries 223. Query formulation module 203 can use queries 623 to query insights from insights cache 602 for insights. Insights 637 can be queried from insights cache 602. Insights 637 can be cached in insights cache 602 from previously received insights. The previously received insights can be returned from data sources 241 in response to prior queries. Insights 237 and 637 can be merged into insights 639. Thus, data arrangement module 104 can consider and process both insights 237 and 637 when presenting insight data 238. Insights 237 can also be stored in insights cache 602 for more efficiently returning insights in response to subsequent queries.

Components not specifically referenced in computer architecture 600 have the same or similar functionality described with respect to those same components in FIGS. 1-5. User history aggregation module 601 and insights cache 602 can interoperate with the other components of computer architecture 600 to perform various described aspects.

Insights can be generated in a variety of different ways. In one example, a user experience provides a chart, natural language query, search result, or other user interface element that can be derived from semantic data. The user experience also provides a user interface for requesting related insights. Semantic data is extracted to generate a search query. A set of topics is used to invoke contextual insight gathering.

Interfaces to insight mining engines can return sets of insights related to the search query and set of topics. The user experience also includes another user interface element in which to display the insights to the user. The insights can be displayed in the other user interface element in a way that enables the user to understand the relevance of the insights based on the context in which the insights were requested.

More specifically, insights can be derived on structured data (e.g., database data). Processing structured data can lead to differences in the types and relevance of metadata that can be derived to find further insights. In one example, a query is used to retrieve data for a chart (other output formats are also possible). The retrieved data as well as information from the query can be leveraged for insights (e.g., (a) why, how, etc. the chart was generated, (b) why, how, etc. data for the chart was selected, (c) types of calculations used to create the data for the chart, (d) express relationships to other data, etc.). Essentially, metadata from one query (possibly combined with metadata from chart contents and other external metadata) is used to derive a user's intent. The user's intent is then used to generate additional relevant queries (1 query→N other relevant queries).

It may also be that two different queries, when executed, access the same data to display in a chart. However, since the queries differ, the user intent might differ even though the retrieved data is the same. As such, different additional queries can be identified as relevant to each different intent.

Query metadata can be used to rank topics and/or relevant parameters used to generate additional queries. Query metadata can also be used to rank individual results from ranked queries. For example, if the top ranked query produces multiple results those are ranked also.

In another aspect, unranked topics and/or relevant parameters from a query are used to rank individual results.

Additional queries can include transforms (zoom in, zoom out, etc.) of an initial query. For example, queries 223 can include one or more transforms of query 131.

As described, resource management can limit how many additional queries and/or insights are processed based on available system resources. Processing capabilities can be considered. For example, more queries and/or insights may be processed on a desktop computer than on a mobile telephone. Screen space can also be considered. In one aspect, presentation of insight data is tailored in view of other items being displayed at a display device.

Accordingly, in general, a user can automatically and efficiently obtain relevant insights into queried data. The relevant insights can be presented along with an arrangement of the queried data at a user interface (e.g., on a display device). Presenting the relevant insights along with the queried data permits the user to readily compare and contrast the relevant insights relative to the queried data. Obtaining relevant insights can be automated, thereby minimizing the user's interaction with the user interface.

Aspects include a hardware processor implemented method for deriving insights for structured data. The method includes the hardware processor accessing a query. The is query used to retrieve structured data that was presented at the display device in a structured arrangement. The method includes the hardware processor analyzing the query to derive contextual metadata from the query. The contextual metadata defines how the structured data was retrieved from a database.

The method includes the hardware processor accessing a query identifying a combination of topics relevant to the structured data based at least on the contextual metadata. The method includes the hardware processor deriving other metadata from user activities and settings at the computer system. The method includes the hardware processor formulating one or more additional queries in system memory to retrieve relevant insights corresponding to the combination of topics. The one or more additional queries formulated from the contextual metadata and the other metadata.

The method includes the hardware processor submitting the one or more additional queries to obtain the relevant insights. The method includes the hardware processor receiving the relevant insights subsequent to submitting the one or more additional queries. The method includes the hardware processor storing the relevant insights in the system memory. The method includes the hardware processor presenting insight data for the relevant insights from the system memory at the display device. The insight data is presented along with the structured arrangement at the display device.

Other aspects include a computer system. The computer system comprises one or more hardware processors, system memory, and a display device. The system memory is coupled to one or more hardware processors. The system memory stores instructions that are executable by one or more hardware processors. The one or more hardware processors are configured to execute the instructions stored in the system memory to derive insights for structured data.

The one or more hardware processors execute instructions stored in the system memory to access a query. The query is used to retrieve structured data that was presented at the display device in a structured arrangement. The one or more hardware processors execute instructions stored in the system memory to analyze the query to derive contextual metadata from the query. The contextual metadata defines how the structured data was retrieved from a database.

The one or more hardware processors execute instructions stored in the system memory to identify a combination of topics relevant to the structured data based at least on the contextual metadata. The one or more hardware processors execute instructions stored in the system memory to derive other metadata from user activities and settings at the computer system. The one or more hardware processors execute instructions stored in the system memory to formulate one or more additional queries in the system memory to retrieve relevant insights corresponding to the combination of topics. The one or more additional queries are formulated from the contextual metadata and the other metadata.

The one or more hardware processors execute instructions stored in the system memory to submit the one or more additional queries to obtain the relevant insights. The one or more hardware processors execute instructions stored in the system memory to receive the relevant insights subsequent to submitting the one or more additional queries. The one or more hardware processors execute instructions stored in the system memory to store the relevant insights in the system memory. The one or more hardware processors execute instructions stored in the system memory to present relevant insight data from the system memory at the display device. The relevant insight data is presented along with the structured arrangement at the display device.

Further aspects include a computer program product for use at a computer system. The computer program product includes computer-executable instructions, that when executed at a hardware processor, cause the computer system to access a query. The query is used to retrieve structured data that was presented at the display device in a structured arrangement. The computer program product includes computer-executable instructions, that when executed at a hardware processor, cause the computer system to analyze the query to derive contextual metadata from the query. The contextual metadata defines how the structured data was retrieved from a database.

The computer program product includes computer-executable instructions, that when executed at a hardware processor, cause the computer system to identify a combination of topics relevant to the structured data based at least on the contextual metadata. The computer program product includes computer-executable instructions, that when executed at a hardware processor, cause the computer system to derive other metadata from user activities and settings at the computer system.

The computer program product includes computer-executable instructions, that when executed at a hardware processor, cause the computer system to formulate one or more additional queries in system memory of the computer system. The one or more additional queries are to retrieve relevant insights corresponding to the combination of topics. The one or more additional queries are formulated from the contextual metadata and the other metadata. The computer program product includes computer-executable instructions, that when executed at a hardware processor, cause the computer system to submit the one or more additional queries to obtain the relevant insights.

The computer program product includes computer-executable instructions, that when executed at a hardware processor, cause the computer system to receive the relevant insights subsequent to submitting the one or more additional queries. The computer program product includes computer-executable instructions, that when executed at a hardware processor, cause the computer system to store the relevant insights in the system memory. The computer program product includes computer-executable instructions, that when executed at a hardware processor, cause the computer system to present relevant insight data from the system memory at the display device. The relevant insights are presented along with the structured arrangement at the display device.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A computer system, the computer system comprising:
   one or more hardware processors; and
   system memory coupled to the one or more hardware processors, the system memory storing instructions that are executable by the one or more hardware processors;
   the one or more hardware processors being configured to execute the instructions stored in the system memory to perform the following:
      process a query comprising a Structured Query Language (SQL) command to retrieve structured data having a structured arrangement;
      derive contextual metadata from parameters of the SQL command, the contextual metadata defining how the structured data was retrieved from a database;
      identify a combination of topics relevant to the structured data based at least on the contextual metadata;
      derive other metadata from user activities and settings at the computer system;
      formulate one or more additional queries in the system memory to retrieve insights corresponding to the combination of topics, the one or more additional queries formulated from the contextual metadata and the other metadata;
      submit the one or more additional queries to obtain the insights;
      receive the insights subsequent to submitting the one or more additional queries; and
      provide for presentation at a display device a first user interface element that includes the structured arrangement and a second user interface element that includes insight data from the insights, the presentation at the display device of the first user interface element being concurrent with the presentation of the second user interface element.

2. The computer system of claim 1, wherein the one or more hardware processors configured to execute the instructions to derive contextual metadata comprise the one or more hardware processors configured to execute the instructions to analyze a query used to retrieve the structured data for presentation at the display device in at least one of: a textual arrangement, a graphical arrangement, and a voice arrangement.

3. The computer system of claim 1, wherein the one or more hardware processors configured to execute the instructions to derive contextual metadata from parameters of the SQL command comprise the one or more hardware processors configured to execute the instructions to derive the intent of the query; and
   wherein the one or more hardware processors configured to execute the instructions to identify the combination of topics relevant to the structured data comprise the one or more hardware processors configured to execute the instructions to identify one or more topics relevant to the intent of the query.

4. The computer system of claim 1, wherein the one or more hardware processors configured to execute the instructions to derive contextual metadata from parameters of the SQL command comprise the one or more hardware processors configured to execute the instructions to identify data filtering characteristics of the query.

5. The computer system of claim 1, wherein the one or more hardware processors configured to execute the instructions to derive contextual metadata from parameters of the SQL command comprise the one or more hardware processors configured to execute the instructions to identify types of calculations included in the query.

6. The computer system of claim 1, wherein the one or more hardware processors configured to execute the instructions to derive other metadata from user activities and settings at the computer system comprise the one or more hardware processors configured to execute the instructions to derive metadata from one or more of: user history, user settings, and search results.

7. The computer system of claim 1, further comprising the one or more hardware processors configured to execute the instructions to determine resource availability at the computer system; and
    wherein the one or more hardware processors configured to execute the instructions to submit the one or more additional queries to obtain the insights comprise the one or more hardware processors configured to execute the instructions to limit the number of queries that are processed based at least on the determined resource availability in view of a rank for each topic included in the combination of topics.

8. The computer system of claim 7, wherein the one or more hardware processors configured to execute the instructions to determine resource availability at the computer system comprise the one or more hardware processors configured to execute the instructions to determine availability of the processor and system memory; and
    wherein the one or more hardware processors configured to execute the instructions to limit the number of queries that are processed comprise the one or more hardware processors configured to execute the instructions to limit the number of queries that are processed to manage the processor and system memory availability.

9. The computer system of claim 8, wherein the one or more hardware processors configured to execute the instructions to determine resource availability at the computer system comprise the one or more hardware processors configured to execute the instructions to determine availability of screen space at the display device, the available screen space limiting the quantity of insights that can be presented along with the structured arrangement;
    wherein the one or more hardware processors configured to execute the instructions to limit the number of queries that are processed comprise the one or more hardware processors configured to execute the instructions to limit the number of queries that are processed to manage the available screen space; and
    wherein the one or more hardware processors configured to execute the instructions to present insight data along with the structured arrangement at the display device comprise the one or more hardware processors configured to execute the instructions to present portions of the insights along with the structured arrangement at the display device within the available screen space.

10. The computer system of claim 1, wherein the one or more hardware processors configured to execute the instructions to formulate one or more additional queries to retrieve insights comprise the one or more hardware processors configured to execute the instructions to formulate at least one additional query that is a transform of the query.

11. A method for use at a computer system, the computer system including a hardware processor, system memory, and a display device, the method comprising:
    accessing a query comprising a Structured Query Language (SQL) command that was processed to retrieve structured data that was presented at the display device in a structured arrangement;
    deriving contextual metadata from parameters of the SQL command, the contextual metadata defining how the structured data was retrieved from a database;
    identifying a combination of topics relevant to the structured data based at least on the contextual metadata;
    deriving other metadata from user activities and settings at the computer system;
    formulating one or more additional queries in the system memory to retrieve insights corresponding to the combination of topics, the one or more additional queries formulated from the contextual metadata and the other metadata;
    submitting the one or more additional queries to obtain the insights;
    receiving the insights subsequent to submitting the one or more additional queries;
    storing the insights in the system memory; and
    providing for presentation at a display device a first user interface element that includes the structured arrangement and a second user interface element that includes insight data from the system memory, the presentation at the display device of the first user interface element being concurrent with the presentation of the second user interface element.

12. The method of claim 11, wherein accessing a query comprises accessing a query that was processed to retrieve structured data that was presented at the display device in at least one of: a chart, a textual arrangement, a graphical arrangement, and a voice arrangement.

13. The method of claim 11, wherein identifying the combination of topics relevant to the structured data comprises identifying one or more topics relevant to the intent of the query.

14. The method of claim 11, wherein deriving contextual metadata from parameters of the SQL command comprises identifying types of calculations included in the query.

15. The method of claim 11, wherein formulating one or more additional queries to retrieve insights comprises formulating at least one additional query that is a transform of the query; and
    further comprising using the combination of topics to rank portions of the insights.

16. The method of claim 11, wherein submitting the one or more additional queries to obtain the insights comprises sending network communication to one or more network connected storage locations to obtain the insights.

17. A system comprising:
    a hardware processor; and
    a computer program product for implementing a method for deriving insights for structured data, the computer program product comprising one or more computer storage devices having stored thereon computer-executable instructions that, when executed by the hardware processor, cause the system to perform the method, including the following:
    access a query comprising a Structured Query Language (SQL) command that was processed to retrieve structured data that was presented at a display device in a structured arrangement;
    derive contextual metadata from parameters of the SQL command, the contextual metadata defining how the structured data was retrieved from a database;
    identify a combination of topics relevant to the structured data based at least on the contextual metadata;

derive other metadata from user activities and settings at the computer system;

formulate one or more additional queries in system memory of the computer system, the one or more additional queries to retrieve insights corresponding to the combination of topics, the one or more additional queries formulated from the contextual metadata and the other metadata;

submit the one or more additional queries to obtain the insights;

receive the insights subsequent to submitting the one or more additional queries;

store the insights in the system memory; and provide for presentation at a display device a first user interface element that includes the structured arrangement and a second user interface element that includes insight data from the system memory, the presentation at the display device of the first user interface element being concurrent with the presentation of the second user interface element.

18. The computer program product of claim 17, further comprising computer-executable instructions that, when executed, cause the computer system to determine resource availability at the computer system; and wherein computer-executable instructions that, when executed, cause the computer system to submit the one or more additional queries to obtain the insights comprise computer-executable instructions that, when executed, cause the computer system to limit the number of queries that are processed based at least on the determined resource availability in view of a rank for each topic included in the combination of topics.

19. The computer program product of claim 18, wherein computer-executable instructions that, when executed, cause the computer system to determine resource availability at the computer system comprise computer-executable instructions that, when executed, cause the computer system to determine availability of the processor resources and system memory resources at the computer system; and wherein computer-executable instructions that, when executed, cause the computer system to limit the number of queries that are processed wherein computer-executable instructions that, when executed, cause the computer system to limit the number of queries that are processed to manage the available processor resources and the available system memory resources.

20. The computer program product of claim 18, wherein computer-executable instructions that, when executed, cause the computer system to determine resource availability at the computer system comprise wherein computer-executable instructions that, when executed, cause the computer system to determine availability of screen space at the display device, the available screen space limiting the quantity of insights that can be presented along with the structured arrangement;

wherein computer-executable instructions that, when executed, cause the computer system to limit the number of queries that are processed comprise computer-executable instructions that, when executed, cause the computer system to limit the number of queries that are processed to manage the available screen space; and wherein computer-executable instructions that, when executed, cause the computer system to present insight data along with the structured arrangement at the display device comprise computer-executable instructions that, when executed, cause the computer system to present portions of the insights along with the structured arrangement at the display device within the available screen space.

* * * * *